(12) United States Patent
Morovic et al.

(10) Patent No.: US 10,837,834 B2
(45) Date of Patent: Nov. 17, 2020

(54) COLOR VALUES (71) Applicant: HEWLETT-PACKARD DEVELOPMENT COMPANY, L.P., Spring, TX (US)

(72) Inventors: Jan Morovic, London (GB); Peter Morovic, Sant Cugat del Valles (ES); Jordi Arnabat Benedicto, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/633,330

(22) PCT Filed: Sep. 8, 2017

(86) PCT No.: PCT/US2017/050651
§ 371 (c)(1),
(2) Date: Jan. 23, 2020

(87) PCT Pub. No.: WO2019/050531
PCT Pub. Date: Mar. 14, 2019

(65) Prior Publication Data
US 2020/0166407 A1 May 28, 2020

(51) Int. Cl.
G01J 3/46 (2006.01)
B41J 2/21 (2006.01)
G06K 15/02 (2006.01)

(52) U.S. Cl.
CPC ............ G01J 3/462 (2013.01); B41J 2/21 (2013.01); G06K 15/1878 (2013.01); G06K 2215/0094 (2013.01)

(58) Field of Classification Search
None
See application file for complete search history.

(56) References Cited

U.S. PATENT DOCUMENTS 5,428,465 A 6/1995 Kanamori et al.
6,130,675 A 10/2000 Murai
(Continued)

FOREIGN PATENT DOCUMENTS

JP 114356 A 1/1999
WO WO-2016206990 12/2016

OTHER PUBLICATIONS

Yongda, C et al., Multi-ink Color-separation Algorithm Improving Image Quality, Mar. 2008, http://www.ingentaconnect.com/content/ist/jist/2008/00000052/00000002/art00013 (1 page).

Primary Examiner — Anh-Vinh T Nguyen
(74) Attorney, Agent, or Firm — HP Inc. Patent Department (57) ABSTRACT A method is described. The method comprises determining a lightness coordinate value corresponding to a first color value along a black-white axis in an input device color space. A set of color values corresponding to the lightness coordinate value, in the input device color space is determined. A subset of the set, based on the respective angular positions of the color values in the set and an angular position of the first color value is determined. The method comprises deriving a set of print color space values of a target printing system comprising print color space values corresponding to the subset and a color value corresponding to the position of the lightness coordinate value, based on a predetermined association between input device color space values and print color space values. The method comprises determining a given print color space value corresponding to the first color value based on the derived set of print color space values.

15 Claims, 5 Drawing Sheets (56) References Cited

U.S. PATENT DOCUMENTS

| | | | |
|---|---|---|---|
| 6,169,609 B1* | 1/2001 | Jacob | H04N 1/6025 358/1.9 |
| 6,304,333 B1 | 10/2001 | Shaked | |
| 6,791,718 B1* | 9/2004 | Allebach | H04N 1/4051 358/3.13 |
| 6,920,243 B2* | 7/2005 | Damera-Venkata | H04N 1/52 358/3.03 |
| 6,924,908 B1 | 8/2005 | Kimia | |
| 7,023,584 B2* | 4/2006 | Cowan | H04N 1/6033 358/1.9 |
| 7,027,182 B1* | 4/2006 | Soler | H04N 1/6022 347/19 |
| 7,118,041 B2* | 10/2006 | Taylor | G06K 19/06037 235/462.09 |
| 7,286,700 B2* | 10/2007 | Gondek | H04N 1/6019 382/162 |
| 7,333,653 B2* | 2/2008 | Luo | G06K 9/0061 382/163 |
| 7,397,588 B2 | 7/2008 | Sloan et al. | |
| 7,433,511 B2* | 10/2008 | Jacob | H04N 1/6022 358/520 |
| 7,612,915 B2* | 11/2009 | Zeng | H04N 1/6027 345/589 |
| 7,678,186 B2* | 3/2010 | Bauer | C09D 11/322 106/31.6 |
| 8,466,936 B2 | 6/2013 | Guo et al. | |
| 8,773,723 B2 | 7/2014 | Nishikawa | |
| 9,613,435 B1 | 4/2017 | Eddins | |
| 9,756,221 B2* | 9/2017 | Morovic | H04N 1/00015 |
| 10,248,825 B2* | 4/2019 | Forman | G06K 9/48 |
| 2003/0002095 A1 | 1/2003 | Gruzdev | |
| 2005/0105111 A1 | 5/2005 | Ott | |
| 2009/0310154 A1* | 12/2009 | Morovic | H04N 1/54 358/1.9 |
| 2017/0013174 A1* | 1/2017 | Morovic | H04N 1/6008 |
| 2017/0048420 A1 | 2/2017 | Morovic | |
| 2017/0151801 A1* | 6/2017 | Gondek | H04N 1/6097 |
| 2018/0007237 A1* | 1/2018 | Morovic | H04N 1/6058 |
| 2019/0116291 A1* | 4/2019 | Maestro Garcia | G06K 9/4652 |
| 2019/0251405 A1* | 8/2019 | Morovic | G06K 15/02 |
| 2019/0297225 A1* | 9/2019 | Maestro Garcia | H04N 1/52 |
| 2019/0373138 A1* | 12/2019 | Gomez Minano | H04N 1/6008 |
| 2020/0045207 A1* | 2/2020 | Morovic | H04N 1/60 |

* cited by examiner

COLOR VALUES

BACKGROUND

Printing instructions for a 2D or 3D printer to print content may be provided based on values in a device color space. Associations between device color values and values in a print color space can be indicated to aid in printing according to printing instructions.

BRIEF DESCRIPTION OF THE DRAWINGS

FIG. 4b illustrates transitions between points of the device color space of FIG. 4a;

FIG. 5a illustrates a first aspect of a plane of the device color space of FIG. 4a; and FIG. 5b illustrates a second aspect of the plane of FIG. 5a

DETAILED DESCRIPTION

In the following description, for purposes of explanation, numerous specific details of certain examples are set forth. Reference in the specification to "an example" or similar language means that a particular feature, structure, or characteristic described in connection with the example is included in that one example, but not necessarily in other examples.

Figure 1A:
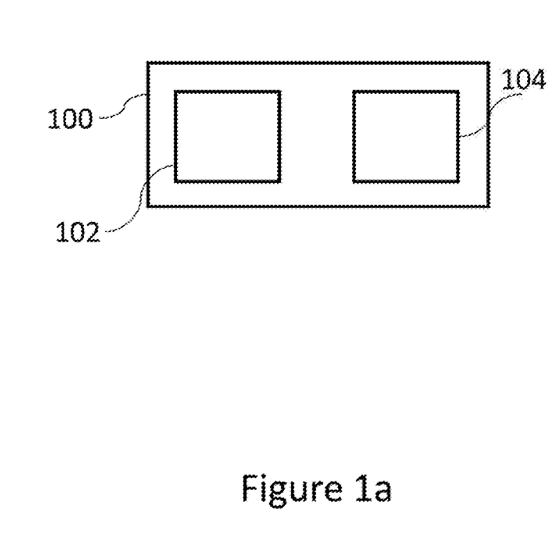
FIG. 1a is a schematic diagram of a computing system according to an example.
Figure 1B:
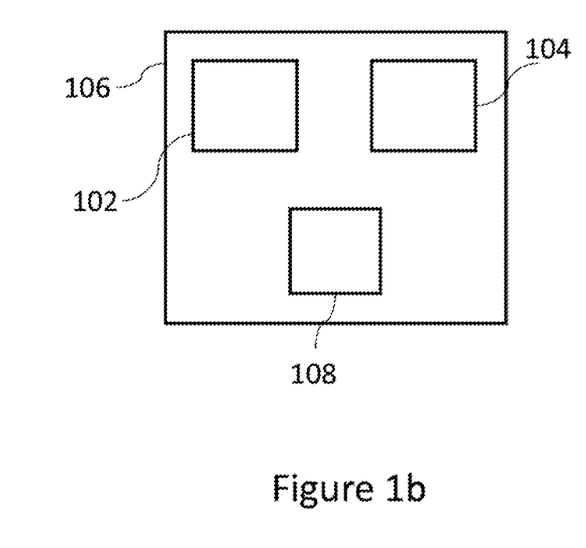
FIG. 1b is a schematic diagram of a printing system.

FIG. 1a schematically illustrates a computing system 100. The computing system 100 may comprise a controller 102 and a data storage unit 104. The controller 102 may comprise, circuitry and may be a general purpose processor, such as a central processing unit (CPU) or may comprise dedicated circuitry, for example. The controller 102 may be in data communication with the data storage unit 104. The controller 102 may be a processing unit arranged to execute instructions, for example computer programs, stored in the storage unit 104. The storage unit 104 may, for example, be a non-transitory computer readable storage medium such as a Read Only Memory (ROM) or Random Access Memory (RAM), a hard disk drive, solid state drive, or flash memory. The computing system 100 may be, for example, a laptop or desktop computer, a printing system, a tablet computer, a PDA, a mobile phone. FIG. 1b illustrates an example of a computing system in the form of a printing system 106. Printing system 106 may in addition comprise a dispensing unit 108 to dispense printing material for printing. The printing system 106 may also connect to an external computing device such as desktop computer, a tablet computer, a PDA, a server, a mobile phone, or the like, and may also connect to a USB thumb drive or portable hard drive. The connection may comprise a data cable and/or a wireless connection, for example. The printing system 106 may be provided with a user interface in order for a user to provide instructions to the printing system 106. The user interface may include buttons, switches, a touch screen interface, and/or the like provided on the printing system 106, for example. The user interface may comprise a software interface which enables a user to interact with the printing system 106.

In the following description, examples of methods are described as being performed by the printing system 106. However, those methods may instead, for example, be performed by an external device connected to the printing system 106 or not connected to the printing system 106 such as computing system 100.

The printing system 106 (hereinafter "printer 106") may, for example, be a two dimensional (2D) or three dimensional (3D) printer to print printing content by dispensing printing material onto printing targets such as paper, card, a bed of build material (in the example of 3D printing), or any other target suitable for printing. The printer 106 may, for example, be an ink-jet printer or a laser printer. In the example of a 2D printer, the printing material dispensed from a dispenser may be ink, toner, wax or the like. In other examples, the printer 106 may be a three dimensional (3D) printer which prints/produces three dimensional objects from, for example, 3D model data using an additive manufacturing process. The 3D printer may use additive manufacturing processes such as laser sintering, fused deposition modelling, stereolithography, or any other manufacturing process to print 3D objects. In the example of the printer 106 being a 3D printer, the printer 106 may use a polymer, resin, or any other suitable material as printing material, and the printing material may be in the form of a build material such as a fluid or a powder, for example.

Figure 2:
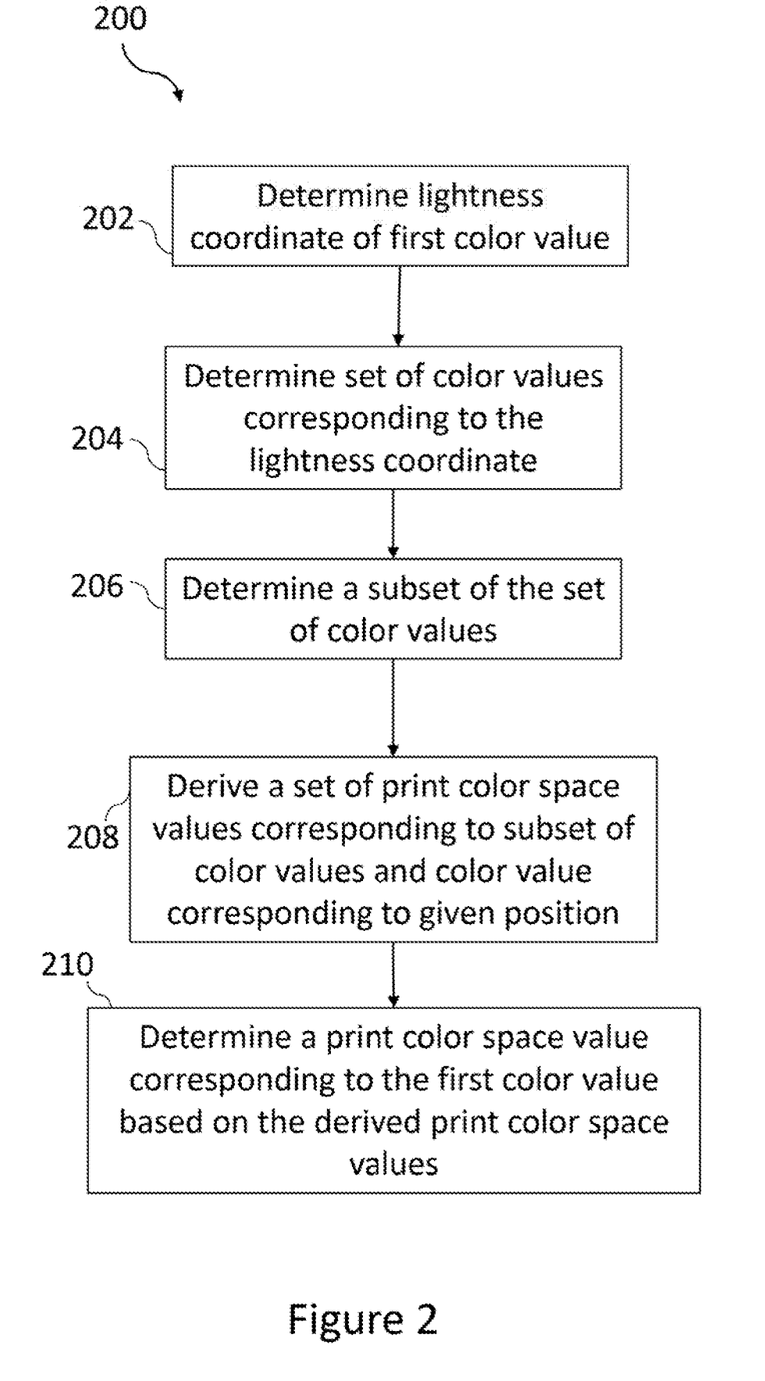
FIG. 2 is a flow diagram of a method according to an example.

FIG. 2 illustrates an example method 200 performed by the printer 106. The method illustrated in FIG. 2 may be performed by the processing unit 102 of printer 106 in accordance with instructions stored in the data storage, unit 104. However, for conciseness, the following descriptions will make reference to the printer 106 performing the methods described.

The printer 106 may receive printing instructions, for example, from an external computing device. The printing instructions may comprise color values in an input device color space. The color values in a color space indicate a position in that color space which corresponds to a color. Color values may thus also be referred to as color coordinates. In order for the printer 106 to implement the printing instructions in, a dispensing process to dispense printing material, the color values in the input device color space may be expressed as color values in the print color space of the printer 106. In other words, the color values in the input device color space may be expressed as color values which indicate a dispensing process to be used by the printer 106.

At 202, the printer 106 determines a lightness coordinate value corresponding to a first color value in an input device color space. The lightness coordinate value may be a coordinate values along a black-white axis in the input device color space. For example, the black-white axis may be a line in the input device color space tracing points which indicate a color substantially between black and white and do not substantially indicate a hue. In other words, points on the black-white axis substantially indicate a "lightness".

The black-white axis may also be referred to as the lightness axis, and the lightness coordinate value, which lies on the lightness axis of the input device color space, may be referred to as the lightness axis value. The lightness may vary from black to white along the lightness axis.

The input device color space is, for example, a color space used to represent colors in a computing device.

At 204, the printer 106 determines a set of color values corresponding to the lightness coordinate value of the first color value in the input device color space. A plane of the input device color space of constant lightness may, for example, be defined by the set of color values determined at

204. The set of color values may, for example, comprise values for transition points between vertices in the input device color space.

At 206, the printer 106 determines a subset of the set of color values. The determination of the subset is based on the respective angular positions of the color values in the set of color values and an angular position of the first color value. The angular positions may be, with respect to a given position which is a position on the black-white coordinate axis of the lightness coordinate value of the first color value. For example, the position on the black-white coordinate, axis of the lightness coordinate value may be used as the origin of a polar coordinate system, and the angular position of the first color value in this coordinate system may comprise an angular position with respect to the origin. The subset of color values may be selected based on their angular position in such a coordinate system and the angular position of the first color value.

The subset of color values may, comprise a second color value and a third color value. The second color value may be the color value of the set of color values closest in angular position to the first color value in a first direction, and the third color value may be the color value of the set of color values closest in angular position to the first color value in a second direction.

At 208, the printer 106 derives a set of print color space values of a target printing system corresponding to the subset of the set of color values and a color value corresponding to the given position. In this example, the target printing system is the printer 106, and the print color space values define a characteristic of a dispensing process at the printing system 106. The print color space values may, for example, comprise Neugebeuar Primary area coverage (NPac) values and/or ink vector values. Deriving the set of print color space values may, for example, comprise an interpolation process.

The print color space values corresponding to the subset of values and a color value corresponding to the given position are derived based on a predetermined association between input device color space values and print color space values for the printer 106. The predetermined association between input device color space values and print color space values may, for example, be indicated in a lookup table (LUT). For example, the LUT may map color values in the input device color space to color values in the print color space. In other words, for example, the LUT may contain color value entries in the print color space corresponding to color value entries in the input device color space.

In some examples, the look-up table may comprise a plurality of color values for transition points on transitions between vertices in the input device color space. The vertices of the input device color space may, for example include the primary and secondary colors of the input device color space as well as black and white. As described above, the set of color values may comprise values for transition points between vertices in the input device color space. The set of color values may, for example comprise a color value for a transition point from each of the transitions between the vertices which cross the plane of constant lightness.

As described above, at 208, a set of print color space values corresponding to the subset of values from 206 and the color value corresponding to the given position are derived. In some examples, certain values from the subset of values or the color value corresponding to the given position may have predetermined corresponding print color space values in the LUT. In an example in which a value from the subset has a corresponding print color space value already present in the LUT, 208 comprises deriving that the print color space value corresponding to that value from the subset is the print color value indicated in the LUT as corresponding to that value from the subset. In the example in which a print color space value to be derived at 208 is not present in the LUT, it may be derived by an interpolation process as explained below.

At 210 of method 200, the printer 106 determines a given print color space value corresponding to the first color value based on the derived set of print color space values from 208. The method 200 at 210 may, for example, comprise taking a weighted sum of the print color space values corresponding to the second color value, the third color value and the color value corresponding to the given position, respectively. The weighted sum may be weighted based on respective positions, relative to a position of the first color value, of the second color value, the third color value and the color value corresponding to the given position.

In one example, the weighted sum may be determined using a barycentric coordinate system. In other examples, a trilinear coordinate system may be used.

The method 200 may additionally comprise storing an association between the first color value and the given print color space value. For example, the association between the first color value and the given print color space value may be stored in the LUT. For example, respective entries for the first color value and the given print color value may be inserted into the LUT in correspondence with each other.

In some examples of the method 200, a set of print color space values may be derived before a subset of the set of color values is determined (i.e. 208 may be performed before 206). In these examples, the printer 106 may derive a set of print color values of the printer 106 corresponding to the set of color values from 204, based on a predetermined association between input device color space coordinates and print color space coordinates for the target printing system.

Given a LUT initially including entries for a plurality of color values for transition points on transitions between vertices in the input device color space as described above, print color values determined using the method 200 may be inserted into the table as one value in corresponding pairs of color values in the input device color space and the print color space initially not present in the LUT.

As described above, in order for the printer 106 to implement received printing instructions in a dispensing process to dispense printing material, the color values in the input device color space, which may be received as part of the printing instructions, may be expressed as color values in the print color space. Thus, the LUT may be used by the printer 106 to determine the print color space values defining characteristics of a dispensing process which correspond to the printing instructions. The LUT may be stored in the storage unit 104 of the printer 106 for this purpose, and accessed by the controller 102.

Method 200 may be used to determine a print color space value corresponding to an input device color space value comprised in the received printing instructions which does not have corresponding entries in the LUT. Method 200 may be performed to determine and include a missing entry into the LUT and may be performed by the printer before printing instructions are received. For example, the method 200 may be performed by the printer 106 when the printer 106 is first installed into a computing environment to include a plurality of entries into the LUT. In other examples, method 200 may be performed (on the fly) when printing instruction are received by the printer 106 in order to determine the print color space values corresponding to the input device color space values comprised in the printing instructions that do not currently have entries in the LUT.

In some examples, the method 200 may be performed in a computing device connected to the printer 106 to either determine print color space values and include same into a LUT independently to printing instructions being, sent to the printer 106 (e.g., when the printer is first installed), or on the fly when printing instructions are sent to the printer 106.

In other examples, method 200 may be performed by a computing device or system either connected to, not connected to, or comprised in the printer 106, in order to generate LUTs that indicate an association between input device color space values and print color space values, LUTs may be generated in this way given a set of initial. LUT entries, for example, a plurality of color values for transition points for each transition between vertices in the input device color space.

Further examples are described below with reference to FIGS. 3 to 5.

In one example, the input device color space may be a device red, green and blue (dRGB) color space, in this example, the print color space may comprise Neugebauer Primary area coverage vectors. In other examples, the print color space may comprise ink vectors.

Figure 3:
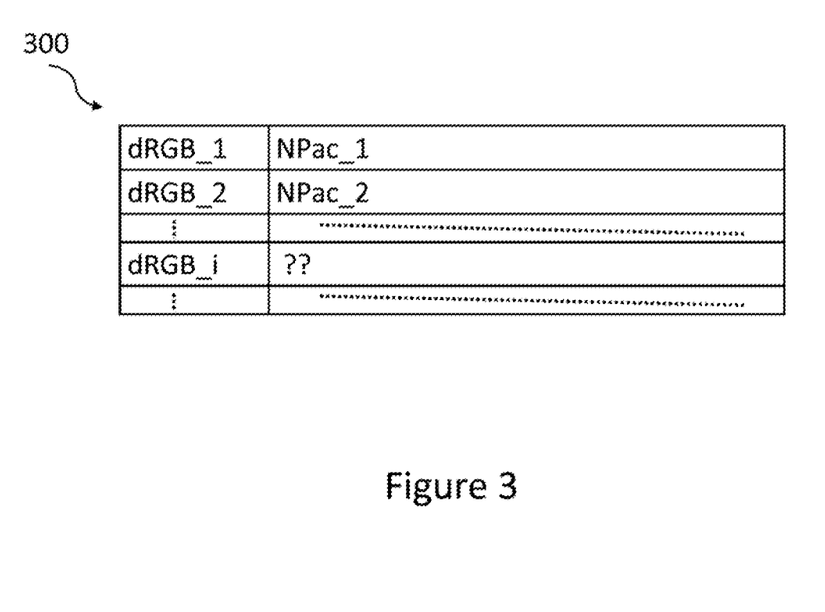
FIG. 3 illustrates a table indicating color value data.
Figure 4A:
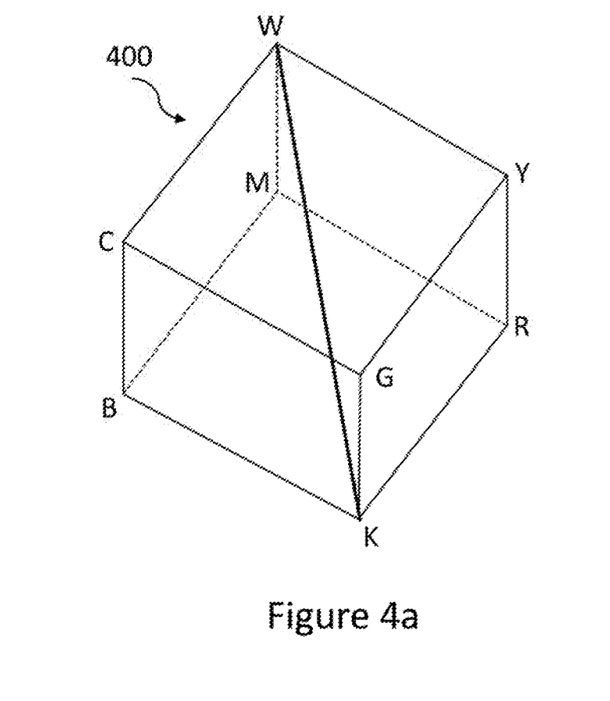
FIG. 4a illustrates a device color space.

FIG. 3 shows an example LUT 300. LUT 300 comprises entries indicating a predetermined association between dRGB values and NPac values. For each dRGB value in the LUT, there is a corresponding NPac value. For example, for the value dRGB_1, there is a value NPac_1 stored in the LUT 300 in correspondence.

In this example, LUT 300 does not comprise NPac values for all dRGB values that may be received as part of printing instructions by the printer 106, and an example of method 200 is used to interpolate, the NPac values corresponding to the dRGB values in the printing instructions which are not comprised in the LUT 300.

In this example, the printer 106 receives printing instructions which comprise a first color value, namely dRGB_i, which does not have a corresponding NPac value stored in LUT 300. An example method as described below in order to determine an NPac value corresponding to dRGB_i into LUT 300.

In this example, the LUT 300 comprises dRGB and corresponding NPac values for a plurality of transition points between the vertices of the dRGB color space. FIG. 4a shows a dRGB cube 400 which represents the dRGB color space. The dRGB cube may, for example, be thought of as representing a three dimensional Cartesian space with each point within the dRGB cube 400 represented by a red (R), a green (G) and a blue (B) coordinate. Each point within the dRGB cube 400 represents a color that is part of the dRGB color space.

At the vertices of the dRGB cube 400, there are: the primary colors of the dRGB color space R, G and B; the secondary colors of the dRGB color space cyan (C), magenta (M) and yellow (Y); and black (K) and white (W).

Figure 4B:
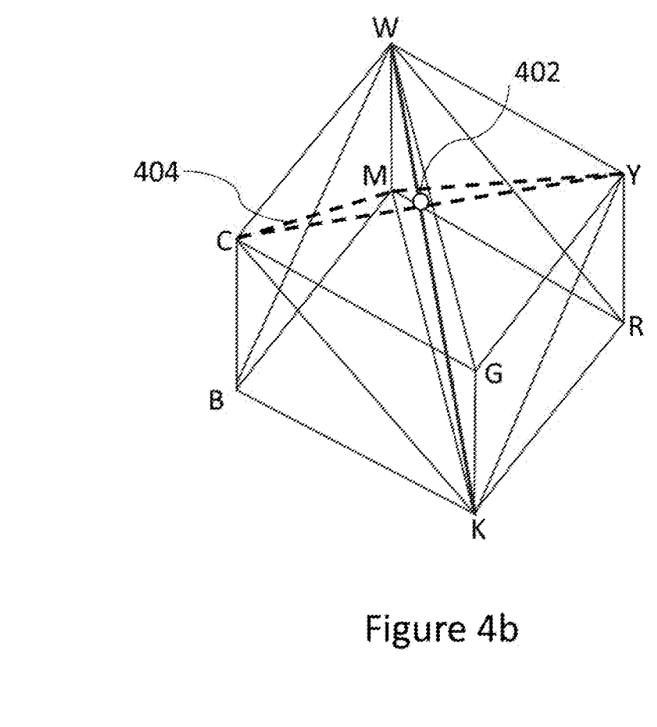
Figure 5A:
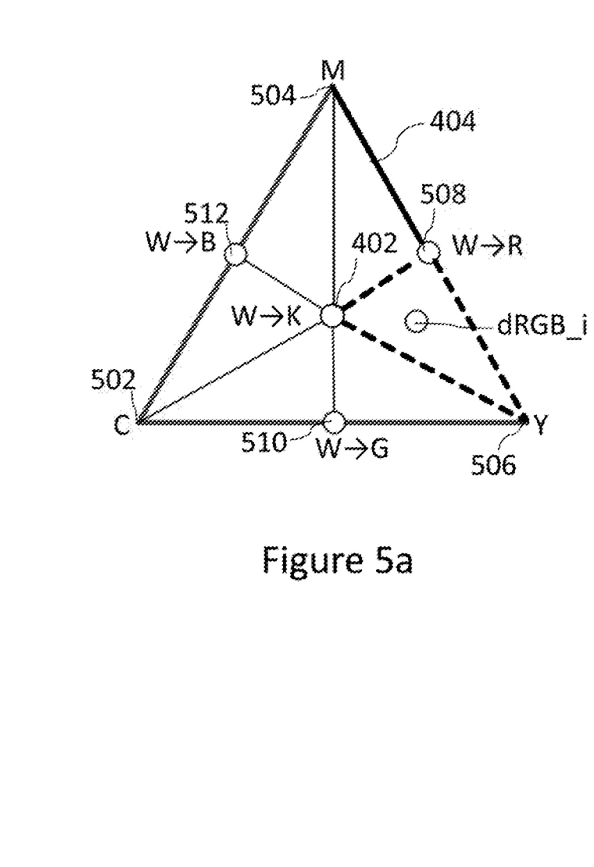

FIG. 4b shows lines connecting the vertices of the dRGB cube 400 which represent transitions between the colors at respective vertices. The lines shown in FIG. 4b may be referred to as transitions. In the following description, the line between vertex W and vertex C is referred to as the W-C transition, and the remaining transitions are referred to in a similar manner. Thus FIG. 4b illustrates the transitions W-C, W-M, W-Y, W-R, W-G, W-B, K-C, K-M, K-Y, K-R, K-G, K-B, G-Y, Y-R, R-M, M-B, B-C, and finally, W-K of dRGB cube 400.

In this example, LUT 300 comprises corresponding dRGB and NPac values for a plurality of points lying on each of the transitions shown in FIG. 4b. Thus, for example, LUT 300 includes a dRGB and corresponding NPac values for a plurality of point on the Y-R transition as well as each of the other transitions described above. LUT 300 may initially comprise a plurality of entries for each transition shown in FIG. 4b as described above. Further entries may be added as a result of performing a method according to an example.

An example, of a method to determine an NPac value corresponding to value dRGB_i included in the printing instructions received by the printer 106 is now described in this example, transition W-K defines the lightness axis of dRGB cube 400. The lightness value may, for example, be determined based on the point on the lightness axis intersected by a plane perpendicular to the lightness axis and containing value dRGB_i.

In this example, the plane perpendicular to the lightness axis and containing value dRGB_i is defined as the plane of constant lightness 404. In this example, the plane of constant lightness 404 is a plane normal to a line joining the W vertex and the lightness coordinate 402 and includes the lightness coordinate 402. In this example, a set of color coordinates corresponding to the lightness coordinate 402 is determined by determining a dRGB value corresponding to the lightness coordinate 402 for each of the transitions that cross constant lightness plane 404 (i.e. the transitions that include a point of the dRGB cube 400 that lies on constant lightness plane 404). In the example of FIG. 4b, transitions W-C, W-M, W-Y, W-R, W-G, W-B and W-K cross constant lightness plane 404.

It will be understood that each dRGB value comprised in the set of color values lies on constant lightness plane 404. The set of color values are referred to as the set of dRGB values in the context of this example.

In this example, LUT 300 includes corresponding dRGB and NPac values for the vertices of dRGB cube 400. As can be seen from FIG. 4b, the dRGB value corresponding to the lightness coordinate (i.e. lying on constant lightness plane 404) for the W-C transition is the C vertex of dRGB cube 400. Similarly, the set of dRGB values includes the M and Y vertices in this example. In this example, the dRGB values to be included in the set of dRGB values corresponding to the vertices C, M and Y are simply retrieved from the LUT 300.

However, in this example, the LUT 300 does not include corresponding dRGB and NPac values for the points of transitions W-R, W-G, and W-B which correspond to the lightness coordinate 402. In this example, dRGB values that lie on constant lightness plane 404 from transitions W-R, W-G, and W-B are determined on the basis of entries for these transitions that are included in LUT 300.

For example, the dRGB values on plane 404 from W-R, W-G and W-B transitions may be linearly interpolated. Taking the example of determining the dRGB value on plane 404 for transition W-R, two dRGB values for transition W-R, already included in the LUT 300, closest in either direction to the dRGB value on plane 404 that is to be determined may be selected.

In this example, linear interpolation is performed using, the two selected dRGB values of transition W-R from LUT 300 in order to determine the dRGB value of transition W-R that lies on constant lightness plane 404 and is therefore included in the set of dRGB values.

In this example, dRGB values of the set of dRGB values that are on the constant lightness plane 404 for the W-G and W-B transitions are determined in a similar manner. It should be noted that the lightness coordinate itself is the dRGB value from transition W-K and is included in the set of dRGB values.

In this example, constant lightness plane 404 along with the set of dRGB values are projected to two dimensions. FIG. 5a shows the projection to two dimensions of the constant lightness plane 404 along with the set of dRGB values. As illustrated by FIG. 5a, in this example, the set of dRGB values comprises the dRGB value corresponding to the lightness coordinate 402; the dRGB values 502, 504 and 506 for the C, M and Y vertices respectively; dRGB value 508 which is on the transition W-R; dRGB value 510 which is on transition and dRGB value 512 which is on transition W-B. The first color value dRGB_i also lies on plane 404.

In this example, a given position is taken to be the origin of a polar coordinate system in which points on plane 404 are represented in terms of a distance from the given position and an angle with respect to the given position. In this example, the given position is the lightness coordinate position 402, which is referred to below as the origin 402.

In order to determine the subset of dRGB values, in this example, a second color value and a third color value are selected. The second color value is the dRGB value on the plane 404 closest in angular distance to value dRGB_i in a first angular direction in the polar coordinate system with origin 402. The third color values is the dRGB value on plane 404 closest in angular distance to value dRGB_i in a second angular direction in the polar coordinate system with origin 402. In the example of FIG. 5a, the first direction is counterclockwise from value dRGB_i and the second, color value is the dRGB value 508. On the other hand, the second direction is clockwise from value dRGB_i and the third color value is the dRGB value 506.

In this example, the subset includes dRGB values 506 and 508. Thus, the subset of the set of color values includes values closest in angular position to dRGB_i either side of, dRGB_i in angular direction and lying on the constant lightness plane 404. In some examples, the colour value of lightness coordinate 402 may also be included in the subset.

In this example, NPac values corresponding to the subset and to the lightness coordinate 402 are derived. In this example, the NPac value corresponding to the dRGB value 506 for the Y vertex is known from LUT 300. For those dRGB values, e.g. 402 and 508 in this example, which do not have a corresponding NPac value in LUT 300, respective NPac values are calculated. For example, the NPac value corresponding to dRGB value 508 may be linearly interpolated in a similar manner to that described above for interpolating the dRGB value 508. For example, the two colour values closest to the dRGB value 508 in either direction on the transition W-R for which there are already entries in the LUT 300 are determined, and the NPac value corresponding to the dRGB value 508 determined by interpolating between the NPac values corresponding to those two color values.

The given NPac value corresponding to the dRGB value of the lightness coordinate 402 may be derived in a similar manner to that of the NPac value corresponding to the dRGB value 508. Although linear interpolation has been presented here as an example, any suitable method for deriving the NPac values of corresponding to the subset and to the lightness coordinate 402 may be.

Figure 5B:
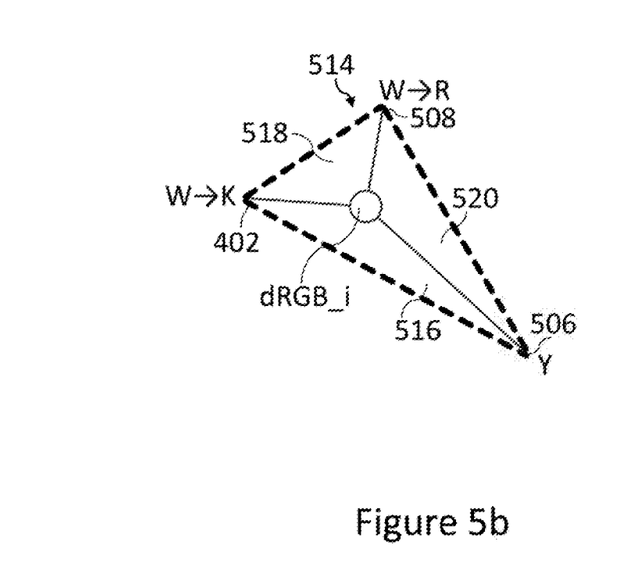

In this example, dRGB values 402, 506 and 508 as well as their respective corresponding NPac values define a triangle 514 shown in FIG. 5b in the constant lightness plane 404 which contains value dRGB_i within it. In this example, the NPac value corresponding to values dRGB_i is determined based on the derived NPac values corresponding to dRGB values 401, 506 and 508.

In one example, a barycentric coordinate system is defined on the basis of the triangle 514 and the NPac value corresponding to dRGB_i is determined using the barycentric coordinate system. In other examples, other suitable coordinate system may be used. For example, a trilinear coordinate system may be used.

In this example, a weighted sum of the derived NPac values is calculated, the weighted sum being weighted based on respective positions of dRGB values 402, 506 and 508 with respect to value dRGB_i. In the example of a barycentric coordinate system, the weight for the NPac value corresponding to 508 is equal to the ratio of the area of the triangle 516 opposite the dRGB value 508 (i.e. triangle 402, dRGBi, 506) to the total area of the triangle 514. Similarly, the weight for the NPac value corresponding to 506 is equal to the ratio of the area of triangle 518 to the total area of the triangle 514. Also, similarly, the weight for the NPac value corresponding to 402 is equal to the ratio of the area, of the triangle 520 to the total area of the triangle 514. The weights are multiplied by their respective derived NPac values and summed, and the NPac value corresponding to the value dRGB_i is determined on that basis, in this example.

The determined given NPac value which corresponds to dRGB_i may be stored for use in printing content by printer 106. In some examples, the association between the given NPac value and value dRGB_i is stored in LUT 300.

Although in the above described specific example, NPac values are derived after a subset of the set of dRGB values is determined, in other example, NPac values, corresponding to all dRGB values in the set of dRGB values may be derived together at 204 of method 200. It will be understood that NPac values corresponding to the subset of dRGB values and lightness coordinate 402 will not be derived subsequently in such examples. In the former case, just those NPac values to be used for the determination of the given NPac value (corresponding to dRGB_i) are derived which would use less processing capacity than deriving a larger number of NPac values. On the other hand, in the example in which NPac values corresponding to the whole set of dRGB values are derived, those derived NPac values may be stored, e.g. in LUT 300, for later use when an NPac value corresponding to a different given dRGB value without an entry initially in LUT 300 is to be determined for printing instruction to be implemented. Thus in such examples, subsequent instances of processing may use less processing resources.

In the above described example, the device color space is the dRGB color space. However the above methods may be applied to data in a device CMYK color space. In these examples, color values for transition points between vertices of a device CMY color space may be defined for different "dK" levels, the dK levels being different levels of black. At a given dK level, the above methods in relation to the corresponding device CMY space may be performed in the same way as described above.

The above methods, basing the generation of print color space values on a lightness characteristic of a color value in the device color space, may provide low grain printed content. By using color values that are on the same constant lightness, plane to generate respective print color space values, a resulting printed pattern is likely to have less contrast among the colors that compose the printed pattern than other methods. Furthermore, the above methods, basing the generation of print color space values on angular position characteristics of a device color space value in a plane of constant lightness, may inhibit color merging or bleeding.

It is to be understood that any feature described in relation to any one example may be used alone, or in combination with other features described, and may also be used in combination with any feature of any other of the examples, or any combination of any other of the examples. Furthermore, equivalents and modifications not described above may also be employed without departing from the scope of the accompanying claims.

What is claimed is:

1. A method comprising:
   determining a lightness coordinate value corresponding to a first color value in an input device color space, the lightness coordinate value being a coordinate value along a black-white axis in the input device color space;
   determining, a set of color values corresponding to the lightness coordinate value of the first color value, in the input device color space;
   determining a subset of the set of color values, based on the respective angular positions of the color values in the set of color values and an angular position of the first color value, each of the angular positions being with respect to a given position, the given position being a position on the black-white coordinate axis of the lightness coordinate value of the first color value;
   deriving a set of print color space values of a target printing system, the set of print color space values comprising print color space values corresponding to the subset of the set of color values and a color value corresponding to the given position, based on a predetermined association between input device color space values and print color space values for the target printing system, the print color space values defining a characteristic of a dispensing process at the target printing system; and
   determining a given print color space value corresponding to the first color value based on the derived set of print color space values.

2. A method according to claim 1, wherein the predetermined association between input device color space values and print color space values is indicated in a look-up table.

3. A method according to claim 1, wherein the set of color values define a plane of constant brightness in the input device color space.

4. A method according to claim 1, wherein the set of color values comprises values for transition points between vertices in the input device color space.

5. A method according to claim 1, wherein the print color space values comprise Neugebeuar Primary area coverage (NPac) values and/or ink vector values.

6. A method according to claim 5, wherein deriving the set of print color space values comprises an interpolation process.

7. A method according to claim 1, wherein the subset of color values comprises a second color value and a third color value, the second color value being the color value of the set of color values closest in angular position to the first color value in a first direction, and the third color value being the color value of the set of color values closest in angular position to the first color value in a second direction.

8. A method according to claim 7, wherein determining the given print color space value comprises taking a weighted sum of the print color space values corresponding to the second color value, the third color value and the color value corresponding to the given position, respectively, the weighted sum being weighted based on respective positions, relative to a position of the first color value, of the second color value, the third color value and the color value corresponding to the given position.

9. A method according to claim 8 comprising determining the weighted sum using a barycentric coordinate system or a trilinear coordinate system.

10. A method according to claim 1 comprising storing an association between the first color value and the given print color space value.

11. A non-transitory computer-readable storage medium storing instructions that when executed by a processor, cause the processor to perform a method, the method comprising:
    determining a lightness axis value corresponding to a first color coordinate of an input device color space, the lightness axis value lying on a lightness axis of the input device color space along which the lightness varies from black to white;
    determining, in the input device color space, a set of color coordinates corresponding to the lightness axis value of the first color coordinate;
    deriving a set of print color space coordinates of a target printing system corresponding to the set of color coordinates, based on a predetermined association between input device color space coordinates and print color space coordinates for the target printing system, the print color space coordinates defining a characteristic of a dispensing process at the target printing system;
    determining a subset of the set of color coordinates, based on respective angular positions of the color coordinates in the set of color coordinates and an angular position of the first color coordinate, each of the angular positions being with respect to the position of the lightness axis value of the first color coordinate on the lightness axis, wherein the lightness axis value is included in the subset; and
    determining a print color space coordinate corresponding to the first color coordinate based on the derived, print color space coordinates.

12. A non-transitory computer-readable storage medium according to claim 11, wherein the print color space coordinate corresponding to the first color coordinate in inserted into a look-up table which indicates the predetermined association between input device color space coordinates and print color space coordinates for the target printing system.

13. A non-transitory computer-readable storage medium according to claim 11, wherein:
    the subset of color coordinates comprises a second color coordinate and a third color coordinate, the second color coordinate being the color coordinate of the set of color coordinates closest in angular position to the first color coordinate in a first direction, and the third color coordinate being the color coordinate of the set of color coordinates closest in angular position to the first color coordinate in a second direction.

14. An apparatus, comprising a controller to:
    determine a lightness coordinate value corresponding to a first color value in an input device color space, the lightness coordinate value being a coordinate value along a black-white axis in the input device color space;

determine, a set of color values corresponding to the lightness coordinate value of the first color value, in the input device color space;

determine a subset of the set of color values, based on the respective angular positions of the color values in the set of color values and an angular position of the first color value, each of the angular positions being with respect to the position on the black-white coordinate axis of the lightness coordinate value of the first color value;

derive a set of print color space values of a target printing system corresponding to the subset of values and the lightness coordinate value based on a predetermined association between input device color space values and print color space values for the target printing system, the print color space values defining a characteristic of a dispensing process at the printing apparatus; and determine a print color space value corresponding to the first color value based on the derived print color space values.

15. An apparatus according to claim 14 comprising the target printing system.

\* \* \* \* \*